(12) United States Patent
Hawes et al.

(10) Patent No.: US 8,257,484 B1
(45) Date of Patent: Sep. 4, 2012

(54) MICROEMULSION PAINT THINNER

(75) Inventors: Charles L. Hawes, Cordova, TN (US); Dennis E. Shireman, Marion, AK (US); Timothy Gerald Teague, Nesbit, MS (US)

(73) Assignee: W. M. Barr & Company, Memphis, TN (US)

( * ) Notice: Subject to any disclaimer, the term of this patent is extended or adjusted under 35 U.S.C. 154(b) by 0 days.

(21) Appl. No.: 13/218,058

(22) Filed: Aug. 25, 2011

Related U.S. Application Data

(60) Provisional application No. 61/377,709, filed on Aug. 27, 2010.

(51) Int. Cl.
*C09D 7/12* (2006.01)
*C09D 5/02* (2006.01)
*C09D 9/00* (2006.01)

(52) U.S. Cl. ......... 106/311; 106/499; 106/504; 252/364

(58) Field of Classification Search .................. 106/311, 106/499, 504; 252/364
See application file for complete search history.

(56) References Cited

U.S. PATENT DOCUMENTS

| | | | |
|---|---|---|---|
| 2,426,277 A | 8/1947 | Miller | |
| 3,532,650 A | 10/1970 | Arvin | |
| 4,199,482 A | 4/1980 | Renaud et al. | |
| 4,507,155 A | 3/1985 | Cheek | |
| 5,082,584 A | 1/1992 | Loth et al. | |
| 5,549,840 A | 8/1996 | Mondin et al. | |
| 5,573,702 A | 11/1996 | Bonnechere et al. | |
| 5,593,958 A | 1/1997 | Mondin et al. | |
| 5,716,925 A | 2/1998 | Mondin et al. | |
| 5,719,114 A | 2/1998 | Zocchi et al. | |
| 5,731,281 A | 3/1998 | Mondin et al. | |
| 5,736,496 A | 4/1998 | Durbut et al. | |
| 5,741,760 A | 4/1998 | Mondin et al. | |
| 5,763,386 A | 6/1998 | Mondin et al. | |
| 5,770,554 A | 6/1998 | Misselyn et al. | |
| 5,798,330 A | 8/1998 | Misselyn et al. | |
| 5,834,413 A | 11/1998 | Durbut et al. | |
| 5,851,971 A | 12/1998 | Durbut et al. | |
| 5,861,367 A | 1/1999 | Blanvalet et al. | |
| 5,939,376 A | 8/1999 | Durbut et al. | |
| 2002/0023305 A1 | 2/2002 | Murphy | |
| 2007/0135325 A1 | 6/2007 | Hawes et al. | |
| 2008/0127995 A1 | 6/2008 | Kinnaird et al. | |
| 2009/0200516 A1* | 8/2009 | Hawes et al. ................. | 252/364 |
| 2009/0211492 A1 | 8/2009 | Hawes et al. | |
| 2011/0162557 A1* | 7/2011 | Hawes et al. ................. | 106/285 |

FOREIGN PATENT DOCUMENTS

| | | | |
|---|---|---|---|
| CA | 2013431 A | * | 3/1990 |
| CA | 1317402 C | | 5/1993 |
| WO | WO 92-18600 A1 | | 10/1992 |

OTHER PUBLICATIONS

International Search Report and Written Opinion mailed Apr. 17, 2012 for PCT/US2011/001506.

* cited by examiner

*Primary Examiner* — Anthony J Green

(74) *Attorney, Agent, or Firm* — Buchanan Ingersoll & Rooney PC

(57) ABSTRACT

A microemulsion paint thinner includes a hydrocarbon solvent, a glycol ether, a carboxylic acid, a base, and water, wherein the carboxylic acid is partially neutralized by the base. A process for thinning oil-based paint includes mixing uncured oil-based paint and the above composition.

25 Claims, 1 Drawing Sheet

MICROEMULSION PAINT THINNER

CROSS REFERENCE TO RELATED APPLICATION

This application claims priority under 35 U.S.C. §119(e) to U.S. provisional Application No. 61/377,709, filed on Aug. 27, 2010, the entire content of which is incorporated herein by reference.

TECHNICAL FIELD

The present disclosure relates to a composition for thinning oil-based paint.

BACKGROUND

Mineral spirits, a hydrocarbon solvent derived from crude oil, is perhaps the most commonly known paint thinner, especially for oil-based paint. Mineral spirits is also commonly used in paint cleanup for the tools and other surfaces used in painting with oil-based and latex-based paint. Because of its direct relation to crude oil, mineral spirits is subject to fluctuations in the price of crude oil, such fluctuations often being upward.

As local, state and federal governments require stricter controls on the amount of volatile organic compounds and combustible chemicals which can be used, the compositions used to thin paint often must be changed to comply with those controls.

Another commonly used paint thinner is turpentine. However, in contrast to mineral spirits, turpentine typically leaves a gummy residue, tends to deteriorate with age and is generally more expensive.

Paint thinner compositions which are predominantly or entirely composed of mineral spirits or turpentine may create safety and storage concerns, as these two materials are highly combustible.

Biodegradability may also be a concern for current paint thinner compositions which are predominantly or entirely composed of mineral spirits.

In addition, when working with paint thinner compositions, the user must also be concerned about the disposal of hazardous substances and the use of non-renewable resources. These two concerns are becoming more important as environmental issues become more significant.

One such known paint thinner is a water containing macroemulsion used for the thinning and clean-up of paint. See copending Application Publication Nos. 2007/0135325, 2009/0200516 and 2009/0211492, entire disclosures of which are incorporated herein by reference.

The macroemulsions contain particle sizes of the internal phase in the range of the wavelength of visible light. Known macroemulsions may achieve thinning results and clean up performance as well as containing a low solids level in order to prevent interference with the physical and chemical properties of the thinned paint, the macroemulsions have at least three major drawbacks. First, since macroemulsions scatter visible light, macroemulsions have the drawback of being opaque or hazy and can tend to hide the cleaning process to the point that the end user cannot tell when equipment or brushes are clean. Secondly, macroemulsions are typically not thermodynamically stable and will separate with time causing a non-uniform presence in the container. This can cause the user to use too much of one phase or less of another when using the product over time. This can affect performance depending on the separation, requiring the user to shake well before using. Thirdly, macroemulsions typically have considerably low performance compared to the traditional hydrocarbon solvents, being up to three times less effective.

Microemulsions are well known in the cleaning and other industries. These typical microemulsions are not suitable for thinning paint. The known microemulsions typically require a high solids load, for example, surfactants, in order to dissolve the thinning agent into a microemulsion. This high solids load typically causes two problems. One, high solids in a paint thinner, when the paint thinner is added to the paint in quantities necessary to thin the paint, usually can cause adverse effects on the chemical and/or physical properties of the paint. These include changes in gloss, dry time, paint film defects, hardness and color. Secondly, at this high level of surfactants, cost can be two to three times higher than either macroemulsions or straight hydrocarbons.

There is a need in the industry for a paint thinner composition for oil-based paint in which the composition eliminates or minimizes the disadvantages or problems encountered with the known compositions.

SUMMARY

Embodiments of the disclosure include a microemulsion paint thinner. In an embodiment, the microemulsion is a visually clear emulsion. Embodiments of the disclosure also include a method of making a composition for thinning oil-based paint. Embodiments of the disclosure also include a process for thinning oil-based paint.

Briefly described, the embodiments of the disclosure provide a new microemulsion paint thinner which contains a hydrocarbon solvent, a glycol ether solvent, a carboxylic acid, a base and water. The carboxylic acid is partially neutralized by the base. Each component is used in a defined weight percent range, based on the total weight of the composition.

Embodiments of the disclosure describe the formulation of a microemulsion paint thinner. In embodiments, the hydrocarbon solvent component and the glycol ether solvent are the internal phase, and the water component is the external phase present as very small droplets dispersed in the hydrocarbon and glycol ether solvents component.

One embodiment is a microemulsion paint thinner, wherein the carboxylic acid is partially neutralized by the base to form a salt of the partially neutralized carboxylic acid.

Another embodiment is a process for thinning oil-based paint, wherein the process comprises mixing uncured oil-based paint and a microemulsion paint thinner and then stirring the mixture, wherein the microemulsion paint thinner comprises a hydrocarbon solvent, a glycol ether, a carboxylic acid, a base, and water.

DETAILED DESCRIPTION OF THE PREFERRED EMBODIMENTS

Figures 1A, 1B:
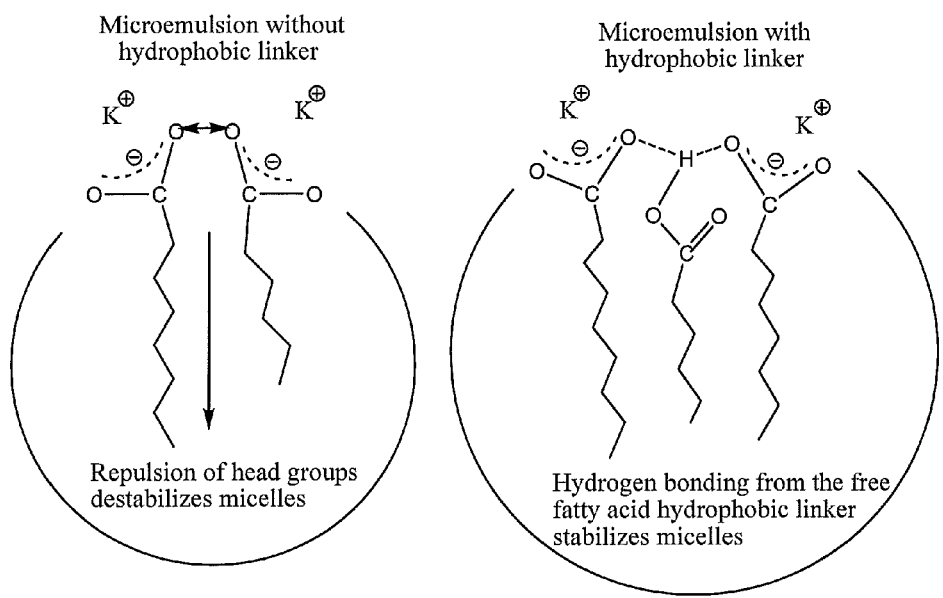
FIG. 1a illustrates microemulsion without hydrophobic linker.
FIG. 1b illustrates microemulsion with hydrophobic linker.

The term "paint" refers to oil-based coatings such as alkyd, enamels, primers, basecoats, varnishes and polyurethane finishes, such coatings being used to protect and/or beautify substrates. As used in this disclosure, the term "paint thinning", "paint thinner" and similar terms refer to compositions and processes which reduce the viscosity of oil-based paint by adding the paint thinner to an oil-based paint and then stirring this mixture before applying the thinned paint to a substrate.

The term "emulsion" refers to a suspension of small globules or droplets of a liquid in a second liquid in which the globules are not soluble. The emulsion can be described as solvent external, in which the liquid globules (sometimes referred to as the internal phase) are suspended in a second or surrounding liquid (sometimes referred to as the external phase). Alternatively, the emulsion can be described as solvent internal.

A preferred microemulsion paint thinner comprises, consists essentially of, or consists of: A. from about 5.0 to about 30.0 percent by weight of hydrocarbon solvent; B. from about 0.01 to about 30.0 percent by weight of glycol ether; C. from about 2.0 to about 15.0 percent by weight of carboxylic acid; D. from about 0.5 to about 10.0 percent by weight of base; and E. from about 30.0 to about 85.0 percent by weight of water. In the paint thinner, the carboxylic acid is partially neutralized by the base. Preferably, the carboxylic acid is a fatty carboxylic acid.

In a preferred embodiment the hydrocarbon solvent may be present in an amount of 8 to 25 percent by weight, more preferably in an amount of 12 to 20 percent by weight. The hydrocarbon solvent helps thin the paint and also acts as a cleaner.

In a preferred embodiment the glycol ether may be present in an amount of 0.5 to 25 percent by weight, more preferably in an amount of 1 to 20 percent by weight. The glycol ether is a co-solvent and improves stability of microemulsion, as well as acting as a cleaner.

In a preferred embodiment the carboxylic acid may be present in an amount of 4 to 12 percent by weight, more preferably in an amount of 6 to 10 percent by weight.

In a preferred embodiment the base may be present in an amount of 0.6 to 8 percent by weight, more preferably in an amount of 0.7 to 3 percent by weight.

It is understood that when a carboxylic acid and a base are mixed, neutralization of the carboxylic acid by the base occurs, thereby forming a salt of the carboxylic acid.

The microemulsion paint thinner may have a very slightly hazy to clear visual appearance.

It has been discovered that the use of partially neutralized salts of carboxylic acids, preferably fatty carboxylic acids, along with water soluble solvents have a remarkable and unexpected ability at a low solids level to dissolve water insoluble solvents into water in sufficient quantities to effectively thin paint at the currently recommended levels of hydrocarbon solvents. It is believed that the free portion of the carboxylic acid in the formula acts as hydrophobic linkers which helps to build more stable and effective oil loving micelles. The partially neutralized salts of carboxylic acids function as an emulsifier or surfactant for the microemulsion paint thinner. FIG. 1a and FIG. 1b illustrate microemulsions without and with hydrophobic linker.

Preferably, the carboxylic acid is partially neutralized with a base, wherein the base is present in an amount from about 20 to about 90, more preferably about 30 to about 60, and most preferably about 35 to about 55 percent mole equivalents of the amount necessary to fully neutralize the carboxylic acid.

Embodiments of the microemulsion paint thinner may preferably have low levels of solids. By "solids" is meant non-volatile compounds. For example, the microemulsion paint thinner may comprises less than 15 percent by weight total solids content, more preferably less than 10 percent by weight total solids content, even more preferably, less than 8 percent by weight total solids content, and most preferably less than 6 percent by weight total solids content.

Embodiments of the microemulsion paint thinner may preferably have low levels of volatile organic compounds (VOC). For example, the microemulsion may comprise less than 300 grams/liter VOC, more preferably less than 250 grams/liter VOC, even more preferably, e.g., from 50 to 200 grams/liter VOC.

In embodiments, the hydrocarbon solvent may be selected from straight, branched or cyclic, saturated or unsaturated hydrocarbon compounds having flash points in the range between 60 and 200 degrees Fahrenheit, or a mixture thereof. For example, the hydrocarbon solvent may be an aliphatic hydrocarbon, aromatic hydrocarbon or a mixture thereof. Preferably, the hydrocarbon solvent may be petroleum distillates, isoparaffins, normal paraffins, Stoddard solvent, Rule 66 solvent, mineral spirits, kerosene, diesel fuel, turpentine, or raffinates or a mixture thereof.

In embodiments, the glycol ether may be ethylene, diethylene, triethylene, propylene, dipropylene or tripropylene glycols with methyl, ethyl, propyl, butyl, pentyl or hexyl ether groups, or a mixture thereof. Preferably, the glycol ether may be 2-butoxyethanol, diethylene glycol butyl ether, triethylene glycol methyl ether, propylene glycol methyl ether, dipropylene glycol methyl ether, propylene glycol propyl ether, propylene glycol butyl ether, dipropylene glycol butyl ether, tripropylene glycol butyl ether, or a mixture thereof.

In embodiments, the carboxylic acid may be a saturated or unsaturated fatty carboxylic acid having from 6 to 20 carbon atoms. For example, the carboxylic acid may be stearic acid, palmitic acid, myrsitic acid, lauric acid, decanoic acid, nonanoic acid, isononanoic acid, octanoic acid, isooctanoic acid, ethylhexanoic acid, oleic acid, linoleic acid, tall oil fatty acid, C20 fatty acid or a mixture thereof. Preferably, the carboxylic acid may be at least one fatty acid, more preferably, the fatty acid may be a linear, straight chain fatty acid. In one embodiment, the carboxylic acid may contain a long-chain fatty acid, e.g., a fatty acid having from 10 to 20 carbon atoms, and a short-chain fatty acid, e.g., a fatty acid having from 6 to 9 carbon atoms. In another embodiment, the carboxylic acid may comprise a mixture of a fatty acid, e.g., oleic acid and tall oil fatty acid, and a carboxylic acid having from 6 to 8 carbon atoms, e.g., 2-ethylhexanoic acid.

In embodiments, the base may be ammonia, morpholine, ethanolamine, diethanolamine, ethylamine, diethylamine, triethylamine, dimethylamine, trimethylamine, cyclohexylamine, ammonium hydroxide, sodium hydroxide, potassium hydroxide or a mixture thereof.

In embodiments, the water used may be distilled, soft, hard, tap, potable, non-potable water, or mixtures thereof.

Optional components may be added to the microemulsion paint thinner. Examples of these optional components include electrolytes, dispersants, chelating agents, corrosion inhibitors, preservatives, colorants, bittering agents, pH adjusting agents, etc. These optional components can be used in the amounts necessary to achieve desired results. In one embodiment, the microemulsion paint thinner further contains a salt, including but not limited to, sodium, potassium, magnesium and ammonium chlorides, and sodium, potassium, magnesium and ammonium sulfates. The addition of a salt in the microemulsion paint thinner can lower the amount of the carboxylic acid needed. When used, the salt may be present in an amount of from about 0.05 to about 0.5 percent, preferably from about 0.1 to about 0.3 percent, by weight.

In another embodiment, an organic acid or the sodium or potassium salt of the organic acid can be added to the microemulsion paint thinner. The preferred organic acid is a monocarboxylic acid, a dicarboxylic acid or a tricarboxylic acid containing one to eight carbon atoms. These organic acids include, but are not limited to, formic acid, acetic acid, propionic acid, butyric acid, oxalic acid, citric acid, and ascorbic acid. The addition of an organic acid or the sodium or potassium salt of the organic acid to the microemulsion paint thinner can lower the amount of emulsifier needed. Citric acid and ascorbic acid also act as an antioxidant and have the additional benefit of improving the color stability of unsaturated emulsifiers, such as oleic acid. When used, the organic acid or the sodium or potassium salt of the organic acid, may be present in an amount of from about 0.05 to 1.0 percent, preferably from about 0.3 to about 0.5 percent by weight.

The microemulsion paint thinner does not sustain combustion and thus can be stored in plastic containers in large volumes, e.g., pallets of one gallon or 2½ gallons plastic containers.

In one embodiment, the microemulsion paint thinner contains 13 to 17 percent by weight of petroleum distillate; 5 to 15 percent by weight of glycol ether; 7 to 9 percent by weight of carboxylic acid; 0.5 to 1 percent by weight of a base; and 60 to 70 percent by weight of water.

A further embodiment involves a process for thinning oil-based paint, wherein the process comprises mixing uncured oil-based paint and a microemulsion paint thinner and then stirring the mixture, wherein the microemulsion paint thinner may be any embodiment described above. As used in this disclosure, the terms "stirred" or "stirring" will be understood to refer to actual stirring, shaking, agitating, mixing or other mixing by mechanical means.

A further embodiment involves a process for cleaning oil-based or latex-based paint, wherein the process comprises applying a microemulsion paint thinner to a surface containing oil-based or latex-based paint and then cleaning the surface, wherein the microemulsion paint thinner may be any embodiment described above.

Embodiments of the disclosure are further illustrated by the following non-limiting examples.

The following microemulsions were prepared using techniques and process steps which are well known in the industry. While the ingredients can be mixed in any order, typically the base can be added last. With the microemulsions of Samples 1-4, the carboxylic acid, the base, and water were mixed together, followed by the addition of hydrocarbon solvent and the glycol ether solvent.

Sample 1
By weight percent of the final composition, the following composition was formed:

| | |
|---|---|
| 60.5 wt % | Water |
| 15.0 wt % | 142 Flash Point Petroleum Distillate |
| 15.0 wt % | 2-Butoxyethanol |
| 8.0 wt % | Oleic Acid |
| 1.5 wt % | Potassium Hydroxide (45%)* |

142 Flash Point Petroleum Distillate is a petroleum distillate with a flash point of 142 degrees Fahrenheit.
*Potassium hydroxide is added as an aqueous solution containing 45% by weight potassium hydroxide.

Sample 2
By weight percent of the final composition, the following composition was formed:

| | |
|---|---|
| 60.0 wt % | Water |
| 15.0 wt % | 142 Flash Point Petroleum Distillate |
| 15.0 wt % | Diethylene Glycol Butyl Ether |
| 8.0 wt % | Tall Oil Fatty Acid |
| 0.5 wt % | 2-Ethylhexanoic Acid |
| 1.5 wt % | Potassium Hydroxide (45%)* |

*Potassium hydroxide is added as an aqueous solution containing 45% by weight potassium hydroxide.

Sample 3
By weight percent of the final composition, the following composition was formed:

| | |
|---|---|
| 60.4 wt % | Water |
| 15.0 wt % | 105 Flash Point Petroleum Distillate |
| 15.0 wt % | 2-Butoxyethanol |
| 8.0 wt % | Oleic Acid |
| 1.6 wt % | Caustic Potash (45%)* |

105 Flash Point Petroleum Distillate is a petroleum distillate with a flash point of 105 degrees Fahrenheit.
*Caustic Potash (sodium hydroxide) is added as an aqueous solution containing 45% by weight Caustic Potash.

Sample 4
By weight percent of the final composition, the following composition was formed:

| | |
|---|---|
| 69.0 wt % | Water |
| 15.0 wt % | 142 Flash Point Petroleum Distillate |
| 5.0 wt % | 2-Butoxyethanol |
| 7.0 wt % | Oleic Acid |
| 1.5 wt % | 2-Ethylhexanoic Acid |
| 2.5 wt % | Ammonium Hydroxide (29% $NH_3$)* |

*Ammonium hydroxide is added as an aqueous solution containing 29% by weight ammonium hydroxide.

Sample 5
By weight percent of the final composition, the following composition was formed:

| | |
|---|---|
| 64.39 wt % | Water |
| 15.00 wt % | 142 Flash Point Petroleum Distillate |
| 15.00 wt % | 2-Butoxyethanol |
| 4.50 wt % | Oleic Acid |
| 0.81 wt % | Potassium Hydroxide (45%)* |
| 0.30 wt % | Sodium Chloride |

*Potassium hydroxide is added as an aqueous solution containing 45% by weight potassium hydroxide.

Sample 6
By weight percent of the final composition, the following composition was formed:

| | |
|---|---|
| 62.45 wt % | Water |
| 15.00 wt % | 142 Flash Point Petroleum Distillate |
| 15.00 wt % | 2-Butoxyethanol |
| 5.00 wt % | Oleic Acid |
| 2.05 wt % | Potassium Hydroxide (45%)* |
| 0.50 wt % | Citric Acid |

*Potassium hydroxide is added as an aqueous solution containing 45% by weight potassium hydroxide.

A Ford Cup Thinning Test, according to ASTM-D1200, was conducted for each of Samples 1-4, and for a pure (100%) solution of 105 Flash Point Petroleum Distillate, a macroemulsion sold, under the trade name of KS PRO, and a macroemulsion sold under the trade name of CROWN NEXT. Two paints were tested, a Sherwin Williams Oil-Based Satin Enamel and Glidden Ultra Hide Oil/Alkyd. Each paint was tested as pure paint and with 16.7 wt % of thinning agent added, for some or all of the above. The results, in terms of seconds to drain 100 mL, are presented below in Table 1:

| THINNING AGENT | SHERWIN WILLIAMS | GLIDDEN |
|---|---|---|
| NONE | 3:09:64 | 4:24:87 |
| Sample 1 | 0:49:02 | 1:30:37 |
| Sample 2 | 0:43:20 | n/a |
| Sample 3 | 0:51:25 | 1:39:40 |
| Sample 4 | 2:04:06 | n/a |
| KS PRO | 2:11:71 | 3:04:49 |
| CROWN NEXT | 1:52:47 | n/a | n/a: not available

It is clear from the data in the above table, Samples 1, 2 and 3 provided better thinning results than the commercially available products KS PRO and CROWN NEXT. Further, Sample 4 achieved similar results as KS PRO and CROWN NEXT.

The present invention has been described in detail with particular reference to certain embodiments, but variations and modifications can be made without departing from the spirit and scope of the invention as defined in the following claims.

The invention claimed is:

1. A microemulsion paint thinner comprising:
   A. from about 5.0 to about 25 percent by weight of hydrocarbon solvent;
   B. from about 0.01 to about 30.0 percent by weight of glycol ether;
   C. from about 2.0 to about 15.0 percent by weight of carboxylic acid;
   D. from about 0.5 to about 10.0 percent by weight of base; and
   E. from about 60 to about 85.0 percent by weight of water, based on the total weight of the microemulsion paint thinner, wherein the carboxylic acid is partially neutralized by the base.

2. The microemulsion paint thinner of claim 1, which is a visually clear microemulsion.

3. The microemulsion paint thinner of claim 1, comprising less than 15 percent by weight total solids content.

4. The microemulsion paint thinner of claim 1, comprising less than 10 percent by weight total solids content.

5. The microemulsion paint thinner of claim 1, comprising less than 300 grams/liter volatile organic compounds.

6. The microemulsion paint thinner of claim 1, wherein the base is provided in an amount from about 30 to about 60 percent by mole of the amount necessary to fully neutralize the carboxylic acid.

7. The microemulsion paint thinner of claim 1, wherein the hydrocarbon solvent is selected from straight, branched or cyclic hydrocarbon compounds having flash points in a range between 60 and 200 degrees Fahrenheit, or a mixture thereof.

8. The microemulsion paint thinner of claim 1, wherein the hydrocarbon solvent is an aliphatic hydrocarbon, aromatic hydrocarbon or a mixture thereof.

9. The microemulsion paint thinner of claim 1, wherein the hydrocarbon solvent is at least one of petroleum distillate, isoparaffin, normal paraffin, Stoddard solvent, mineral spirits, kerosene, diesel fuel, turpentine, or a mixture thereof.

10. The microemulsion paint thinner of claim 1, wherein the glycol ether is ethylene, diethylene, triethylene, propylene or dipropylene glycols with methyl, ethyl, propyl, butyl or pentyl ether groups, or a mixture thereof.

11. The microemulsion paint thinner of claim 1, wherein the glycol ether is 2-butoxyethanol, diethylene glycol butyl ether, triethylene glycol methyl ether, propylene glycol methyl ether, dipropylene glycol methyl ether, propylene glycol propyl ether, propylene glycol butyl ether, dipropylene glycol butyl ether, tripropylene glycol butyl ether, or a mixture thereof.

12. The microemulsion paint thinner of claim 1, wherein the carboxylic acid is a saturated or unsaturated carboxylic acid having from 6 to 20 carbon atoms.

13. The microemulsion paint thinner of claim 1, wherein the carboxylic acid is stearic acid, palmitic acid, myrsitic acid, lauric acid, decanoic acid, nonanoic acid, isononanoic acid, octanoic acid, isooctanoic acid, ethylhexanoic acid, oleic acid, linoleic acid, tall oil fatty acid, C20 fatty acid or a mixture thereof.

14. The microemulsion paint thinner of claim 1, wherein the carboxylic acid comprises a fatty acid.

15. The microemulsion paint thinner of claim 14, wherein the fatty acid comprises a linear, straight chain fatty acid.

16. The microemulsion paint thinner of claim 14, further comprising 2-ethylhexanoic acid.

17. The microemulsion paint thinner of claim 1, wherein the carboxylic acid comprises a mixture of a fatty acid having from 10 to 20 carbon atoms, and a fatty acid having from 6 to 9 carbon atoms.

18. The microemulsion paint thinner of claim 1, wherein the base is ammonia, morpholine, ethanolamine, diethanolamine, ethylamine, diethylamine, triethylamine, dimethylamine, trimethylamine, cyclohexylamine, ammonium hydroxide, sodium hydroxide, potassium hydroxide or a mixture thereof.

19. The microemulsion paint thinner of claim 1, wherein the base is provided in an amount from about 20 to about 90 percent by mole of the amount necessary to fully neutralize the carboxylic acid.

20. A process for preparing the microemulsion paint thinner of claim 1, wherein the process comprises mixing:
   A. from about 5.0 to about 25 percent by weight of hydrocarbon solvent;
   B. from about 0.01 to about 30.0 percent by weight of glycol ether;
   C. from about 2.0 to about 15.0 percent by weight of carboxylic acid;
   D. from about 0.5 to about 10.0 percent by weight of base; and
   E. from about 60 to about 85.0 percent by weight of water, based on the total weight of the microemulsion paint thinner, wherein the carboxylic acid is partially neutralized by the base to form partially neutralized carboxylic acid.

21. The microemulsion paint thinner of claim 1, wherein the microemulsion paint thinner comprises from about 5.0 to about 20 percent by weight of the hydrocarbon solvent.

22. A microemulsion paint thinner comprising 13 to 17 percent by weight of petroleum distillate; 5 to 15 percent by weight of glycol ether; 7 to 9 percent by weight of carboxylic acid; 0.5 to 1 percent by weight of a base; and 60 to 70 percent by weight of water, based on the total weight of the microemulsion paint thinner,
   wherein the carboxylic acid is partially neutralized by the base.

23. A microemulsion paint thinner comprising:
   A. from about 5.0 to about 30.0 percent by weight of hydrocarbon solvent;

B. from about 0.01 to about 30.0 percent by weight of glycol ether;
C. from about 2.0 to about 15.0 percent by weight of carboxylic acid;
D. from about 0.5 to about 10.0 percent by weight of base; and
E. from about 30.0 to about 85.0 percent by weight of water, based on the total weight of the microemulsion paint thinner, wherein the carboxylic acid is partially neutralized by the base,
the microemulsion paint thinner further comprising an organic acid or a sodium or potassium salt thereof in an amount of about 0.05 to 1.0 percent by weight, based on the total weight of the microemulsion paint thinner, wherein the organic acid is different from the carboxylic acid.

24. A microemulsion paint thinner comprising:
A. from about 5.0 to about 30.0 percent by weight of hydrocarbon solvent;
B. from about 0.01 to about 30.0 percent by weight of glycol ether;
C. from about 2.0 to about 15.0 percent by weight of carboxylic acid;
D. from about 0.5 to about 10.0 percent by weight of base; and
E. from about 30.0 to about 85.0 percent by weight of water, based on the total weight of the microemulsion paint thinner, wherein the carboxylic acid is partially neutralized by the base,
the microemulsion paint thinner further comprising an organic acid or a sodium or potassium salt thereof in an amount of about 0.05 to 1.0 percent by weight, based on the total weight of the microemulsion paint thinner, wherein the organic acid is formic acid, acetic acid, propionic acid, butyric acid, oxalic acid, citric acid, or ascorbic acid.

25. A process for thinning oil-based paint, wherein the process comprises mixing uncured oil-based paint and a microemulsion paint thinner comprising:
A. from about 5.0 to about 30.0 percent by weight of hydrocarbon solvent;
B. from about 0.01 to about 30.0 percent by weight of glycol ether;
C. from about 2.0 to about 15.0 percent by weight of carboxylic acid;
D. from about 0.5 to about 10.0 percent by weight of base; and
E. from about 30.0 to about 85.0 percent by weight of water, based on the total weight of the microemulsion paint thinner, wherein the carboxylic acid is partially neutralized by the base.

* * * * *